US011112246B2

(12) United States Patent
Blankenship (10) Patent No.: US 11,112,246 B2
(45) Date of Patent: Sep. 7, 2021

(54) TORSIONAL OSCILLATOR MICRO ELECTRO MECHANICAL SYSTEMS ACCELEROMETER

(71) Applicant: UNITED STATES GOVERNMENT AS REPRESENTED BY THE SECRETARY OF THE ARMY, Washington, DC (US)

(72) Inventor: Clinton Blankenship, Redstone Arsenal, AL (US)

(73) Assignee: United States Government as represented by the Secretary of the Army, Washington, DC (US)

( * ) Notice: Subject to any disclaimer, the term of this patent is extended or adjusted under 35 U.S.C. 154(b) by 34 days.

(21) Appl. No.: 16/442,112

(22) Filed: Jun. 14, 2019

(65) Prior Publication Data

US 2020/0393247 A1 Dec. 17, 2020

(51) Int. Cl.
*G01P 15/18* (2013.01)
*G01P 15/097* (2006.01)
*G01P 15/14* (2013.01)
*G01P 15/08* (2006.01)
*G01C 19/5712* (2012.01)

(52) U.S. Cl.
CPC ...... *G01C 19/5712* (2013.01); *G01P 15/0802* (2013.01); *G01P 15/097* (2013.01); *G01P 15/14* (2013.01); *G01P 15/18* (2013.01); *G01P 2015/0825* (2013.01)

(58) Field of Classification Search
CPC .... G01P 15/097; G01P 15/0802; G01P 15/08; G01P 15/14; G01P 15/18
See application file for complete search history.

(56) References Cited

U.S. PATENT DOCUMENTS

| 3,269,192 A | 8/1966 | Southworth, Jr. |
| 4,479,385 A | 10/1984 | Koehler |
| 4,699,006 A | 10/1987 | Boxenhorn |

(Continued)

FOREIGN PATENT DOCUMENTS

EP 0411077 B1 6/1991

OTHER PUBLICATIONS

Jha, Chandra Mohan, et al., "Thermal Isolation of Encapsulated MEMS Resonators, Journal of Microelectrocmechanical Systems", Feb. 2008, pp. 175-184, vol. 17, No. 1, United States.

*Primary Examiner* — Helen C Kwok
(74) *Attorney, Agent, or Firm* — Alberto Interian, III (57) ABSTRACT

A resonant mechanical structure, such as one for use in a torsional oscillator MEMS accelerometer that includes a mounting substrate and a reference mass configured to move within a reference mass plane, the resonant mechanical structure being connected to the mounting structure and the reference mass, and the resonant mechanical structure including a body, a center of mass, and an aperture, wherein the aperture is surrounded and defined by the body, and wherein the body includes a first mass portion and a second mass portion that are configured to oscillate about an oscillation axis located within the reference mass plane, wherein the center of mass is located on the oscillation axis, and wherein a movement of the reference mass within the reference mass plane varies a moment of inertia of the body while the center of mass of the body remains located on the oscillation axis.

20 Claims, 13 Drawing Sheets

(56) References Cited

U.S. PATENT DOCUMENTS

| | | | |
|---|---|---|---|
| 4,712,427 A | 12/1987 | Peters | |
| 4,872,343 A * | 10/1989 | Peters | G01L 1/162 |
| | | | 73/514.29 |
| 4,939,935 A * | 7/1990 | Amand | G01P 1/006 |
| | | | 73/514.29 |
| 4,945,765 A | 8/1990 | Roszhart | |
| 5,020,370 A | 6/1991 | Deval | |
| 5,668,329 A * | 9/1997 | Petri | G01L 1/106 |
| | | | 73/862.59 |
| 5,780,742 A | 7/1998 | Burns | |
| 5,969,249 A | 10/1999 | Roessig | |
| 6,161,440 A * | 12/2000 | Hulsing, II | G01C 19/5719 |
| | | | 310/321 |
| 6,450,032 B1 | 9/2002 | Albert | |
| 6,725,719 B2 | 4/2004 | Cardarelli | |
| 8,955,382 B2 * | 2/2015 | Dwyer | G01C 19/5607 |
| | | | 73/504.16 |
| 9,389,077 B2 | 7/2016 | Comi | |
| 2002/0092352 A1 * | 7/2002 | Foote | G01P 15/097 |
| | | | 73/514.21 |
| 2003/0209073 A1 | 11/2003 | Carroll | |
| 2004/0016307 A1 | 1/2004 | Albert | |
| 2004/0226371 A1 | 11/2004 | Baudry | |
| 2008/0087083 A1 * | 4/2008 | Nishizawa | G01P 15/097 |
| | | | 73/514.29 |
| 2008/0229566 A1 * | 9/2008 | Saito | G01P 15/0802 |
| | | | 29/25.35 |
| 2011/0234206 A1 * | 9/2011 | Kawakubo | G01P 15/18 |
| | | | 324/162 |
| 2016/0139170 A1 * | 5/2016 | Dwyer | G01P 15/03 |
| | | | 73/514.29 |
| 2016/0139171 A1 * | 5/2016 | Becka | G01P 15/032 |
| | | | 73/514.29 |
| 2020/0025792 A1 * | 1/2020 | Reinke | B81B 7/007 |
| 2020/0064367 A1 * | 2/2020 | Strehlow | G01P 15/097 |

* cited by examiner

FIGURE 1

PRIOR ART

FIGURE 2

PRIOR ART

TORSIONAL OSCILLATOR MICRO ELECTRO MECHANICAL SYSTEMS ACCELEROMETER

FIELD

This disclosure relates generally to accelerometers. More particularly, this disclosure relates to a micro electro-mechanical systems ("MEMS") accelerometer using a torsional oscillatory pick-off having a varying moment of inertia, which provides enhanced sensor performance parameters including reduced noise and scale factor error.

BACKGROUND

MEMS technology generally refers to miniaturized mechanical and electro-mechanical structures that are made using microfabrication techniques. MEMS structures vary in size, ranging from below one micron up to several millimeters. MEMS structures also vary in complexity, ranging from relatively simple structures without any moving elements to more complex electromechanical systems with multiple moving elements under the control of integrated microelectronics.

One type of MEMS structure is an actuator, such as a thermal actuator. Another type of MEMS structure is an inertial sensor. MEMS technology has made it easy to manufacture small and light inertial sensors, extending the range of applications for inertial sensors. One type of an inertial sensor is a MEMS gyroscope. Another type of an inertial sensor is a MEMS accelerometer.

A MEMS accelerometer is typically used to measure acceleration along a defined input axis. Typically, a MEMS accelerometer has a reference mass (also referred to as a "proof mass") that is supported within a housing. The housing is attached to another body, such as a circuit board in or on an electronic device, for the purpose of measuring the motion of that body. When the body accelerates, the reference mass moves relative to the housing. The movement of the reference mass is measured by a sensing assembly, often referred to as a "pick-off," thereby enabling the motion of the body to be determined.

Figure 1:
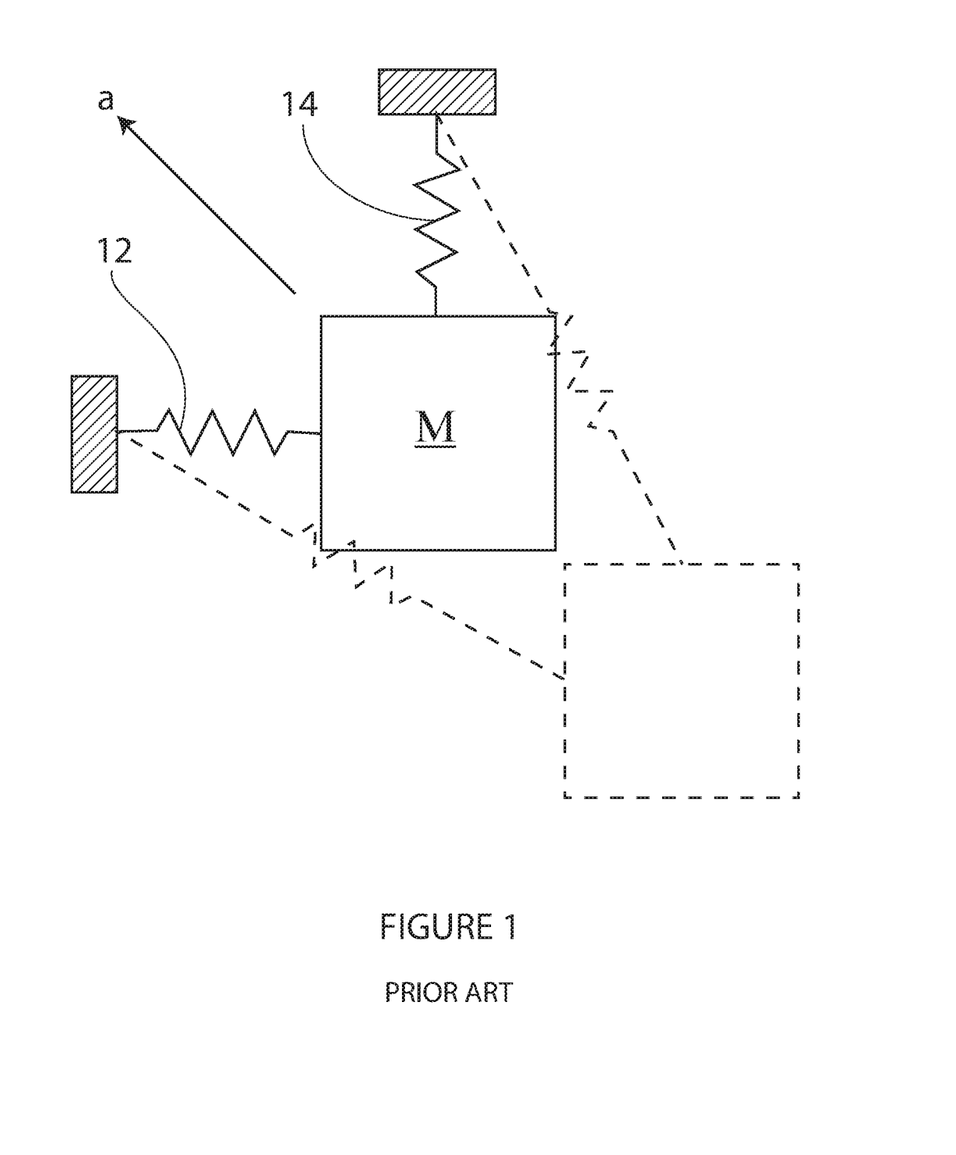
FIG. 1 is a schematic representation of a spring and mass accelerometer model.

Referring to FIG. 1, a MEMS accelerometer can be generally be modeled as a spring and mass system having a reference mass M and springs 12 and 14. Displacement of the reference mass M (shown in phantom lines in FIG. 1) occurs as a result of an applied acceleration a in the indicated direction. Acceleration a can be determined based the spring constant k of springs 12 and 14, the mass of reference mass M, and displacement of the reference mass.

Depending on the industry and the specific use case, there are numerous designs for MEMS accelerometers. For example, the design of a MEMS accelerometer used in the automotive industry for airbag deployment may vary from the design of a MEMS accelerometer used in the computer industry for shock detection on a hard disk, which may vary from the design of a MEMS accelerometer used in the aerospace industry for detecting the movement of a drone. One differentiating factor amongst the various MEMS accelerometer designs is the sensing assembly used to detect the amount of displacement of a reference mass.

One sensing assembly used within MEMS accelerometers is known as a capacitive pick-off. For a MEMS accelerometer with a capacitive pick-off, the accelerometer includes a pair of spaced, stationary substrates having opposed parallel planar faces. Each substrate has a metal electrode layer of predetermined configuration deposited on one surface to form respective capacitor electrodes. One electrode element operates as an excitation electrode to receive stimulating signals and the other electrode element operates as a feedback electrode for electrostatic rebalance. A movable sensing element acts as the capacitive pick-off. The movable sensing element is connected to the reference mass and is located between the capacitor electrodes. Movement of the sensing element in response to movement of the response mass alters the position of the sensing element relative to the capacitor electrodes. This results in a change in the capacitance of the capacitor electrodes, which is representative of the displacement of the reference mass along the sensitive axis of the accelerometer. The change in the capacitance may be used as a displacement signal and applied to a servo system that includes one or more electromagnets (e.g., a force-rebalancing coil) to return the reference mass to its at-rest position.

One example of a capacitive pick-off type accelerometer is a "finger-type" capacitive pick-off accelerometer, such as the one disclosed in U.S. Pat. Pub. No. 2003/0209073 A1. A problem with capacitive pick-off type accelerometers, such as the finger-type capacitive accelerometer, is that they produce undesirably low signal-to-noise ratio and they produce an undesirably high scale factor error, resulting in noisy output signals and low sensitivity.

Another sensing assembly used within MEMS accelerometers is known as a resonant pick-off, which relies on a resonant mechanical structure as a means to measure the force acting upon the reference mass. For a MEMS accelerometer with a resonant pick-off, the resonant mechanical structure is excited or driven into an oscillatory motion having a frequency. The frequency of the oscillatory motion may depend on several factors, including the shape of the resonant mechanical structure, anchor point(s) of the resonant mechanical structure, and the various mechanical properties of the material selected for resonant mechanical structure. Acceleration of the body whose motion is being measured by the accelerometer results in force being applied to the resonant mechanical structure, which in turn alters the resonant frequency of the resonant mechanical structure. The alteration of the resonant frequency is then used to determine the acceleration of the body whose motion is being measured. The frequency information, and/or the generated signal may be manipulated through various processes, whether they be hardware or software in nature, to create a useful device output signal or message.

Figure 2:
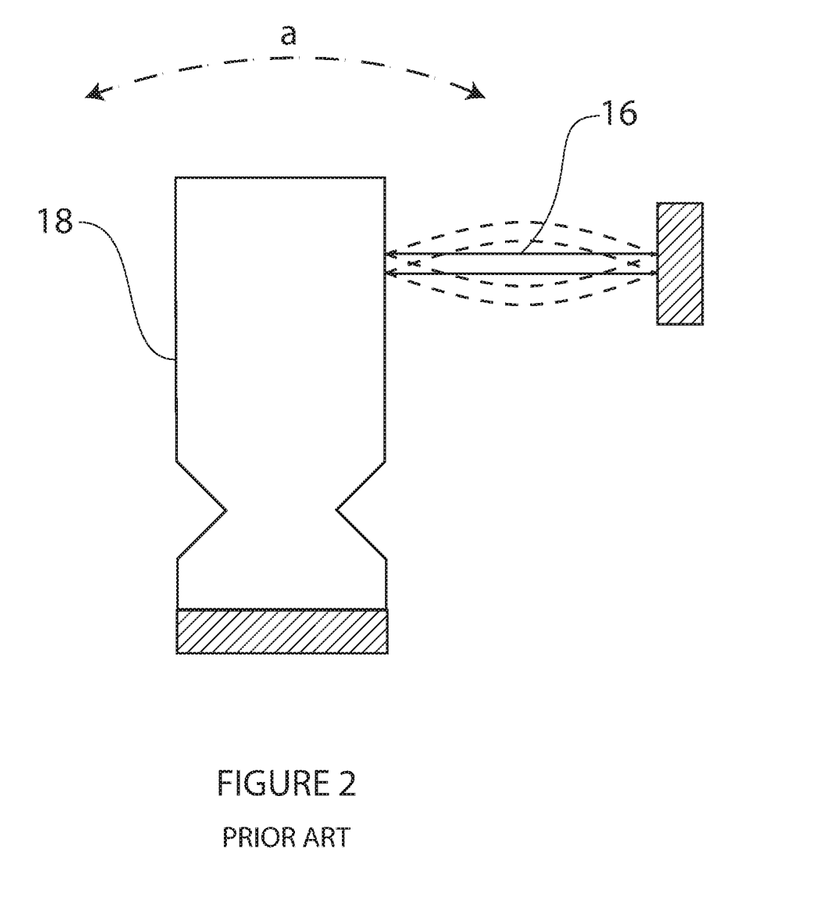
FIG. 2 is a schematic representation of a resonant beam pick-off with pendulous mass.

FIG. 2 illustrates an example of a MEMS accelerometer with an oscillatory beam 16 functioning as a resonant pick-off. The oscillatory beam 16 is excited or driven into an oscillatory motion having a resonant frequency f. The oscillation of the oscillatory beam 16 is shown in phantom lines. The oscillatory beam 16 can be driven into the oscillatory motion in various ways. For example, the oscillatory beam 16 can be fabricated of silicon having a thin piezo film deposited on its surface. Deformation of the thin piezo film generates a signal that is amplified and passed to a frequency counting electronic. Thus, the thin piezo film coupled with the frequency counting electronic enables the resonant frequency of the oscillatory beam 16 to be observed. Applying a voltage to the oscillatory beam 16 excites the beam into the oscillatory motion having the resonant frequency f. Movement of the reference mass 18 as a result of acceleration places the oscillatory beam 16 into either compression or tension (depending upon the direction in which the reference mass is moving). Deformation of the oscillatory beam 16 alters the resonant frequency of the oscillatory beam such that the MEMS accelerometer can determine the acceleration of the body whose motion is being measured.

Examples of the oscillatory beam type accelerometer depicted in FIG. 2 can be found in U.S. Pat. Nos. 5,969,249, 4,939,935, and 6,725,719, which presents a gyroscope using a beam type resonant body. In these examples, beam 16 takes the form of tuning fork, and more specifically, a double ended tuning fork.

A known problem associated with MEMS accelerometers such as those illustrated in FIG. 2, and disclosed in the '249, '935, and '719 references, is that they are associated with undesirable levels of output signal noise and scale factor error, albeit not to the same extent as capacitive-type accelerometers. Scale factor refers to the ratio between the measured output of a MEMS accelerometer and the change in sense input. Thus, if the input to an accelerometer is in gravity G and the measured output is in volts V, the scale factor would be denoted as V/G. In general, the scale factor is calculated as the slope of a straight line fitted by a least-squares method on a plot of the sensor output over the full input range. Scale factor error is the ratio of the deviation from the fitted straight line slope (sometimes referred to as the "output error") over the input.

One factor resulting in scale factor error in a MEMS accelerometer similar to the ones shown in FIG. 2, and disclosed in the '249, '935, and '719 references, are the non-linear effects inherent within beam deformation. In other words, the behavior of the oscillatory beam 16 within the MEMS accelerometer is highly non-linear, thus increasing the scale factor error.

In sum, the performance of present miniaturized accelerometers is effected by a number of device error sources. Two major sources of error in these devices are measurement noise and scale factor error. In many cases the pick-off(s) for accelerometers can be a large contributor to poor noise performance. Typically, accelerometers having resonant structure based pick-offs have better overall noise performance. Generally speaking, errors in scale factor cause errors in the interpretation of the device output. Scale factor error can be excited by various environmental conditions such as temperature, linear acceleration, angular acceleration, and the like. Scale factor error can be a combination of both linear and non-linear errors. Most manufacturers attempt to compensate accelerometers for these linear and non-linear scale factor errors, as disclosed in those patent references discussed above. Nevertheless, in many cases it is difficult to sufficiently compensate for non-linear errors resulting in residual error.

Therefore, a new MEMS accelerometer having a resonant pick-off with a reduced scale factor error is needed.

BRIEF SUMMARY

The invention presented here seeks to significantly reduce the effects of noise and scale factor errors through the use of a novel pick-off structure. This is accomplished by exploiting the mass properties of the pick-off by linearizing its response to applied force.

More specifically, the present disclosure provides a MEMS inertial sensor having a resonant pick-off. The MEMS inertial sensor includes a mounting substrate, a reference mass, and a resonant mechanical structure. The reference mass is configured to move within a reference mass plane. The resonant mechanical structure is connected to the mounting substrate. The resonant mechanical structure has a body and an opening. The body surrounds and defines the opening. The body has an upper mass, a lower mass, and a center of mass. The resonant mechanical structure is configured such that the upper and lower masses oscillate about an oscillation axis. The oscillation axis is located within the reference mass plane. The body has a moment of inertia when the upper and lower masses are oscillating about the oscillation axis. The center of mass of the body is located on the oscillation axis. The reference mass is connected to the resonant mechanical structure in a manner such that movement of the reference mass within the reference mass plane varies the moment of inertia of the body while the center of mass remains located on the oscillation axis.

BRIEF DESCRIPTION OF THE DRAWINGS

For a better understanding of the nature and objects of the disclosure, reference should be made to the following detailed description taken in conjunction with the accompanying drawings, in which:

FIG. 4b illustrates an isometric view of the resonant mechanical structure shown in FIG. 4a.

Like reference numerals refer to corresponding parts throughout the drawings.

DETAILED DESCRIPTION

Figure 3:
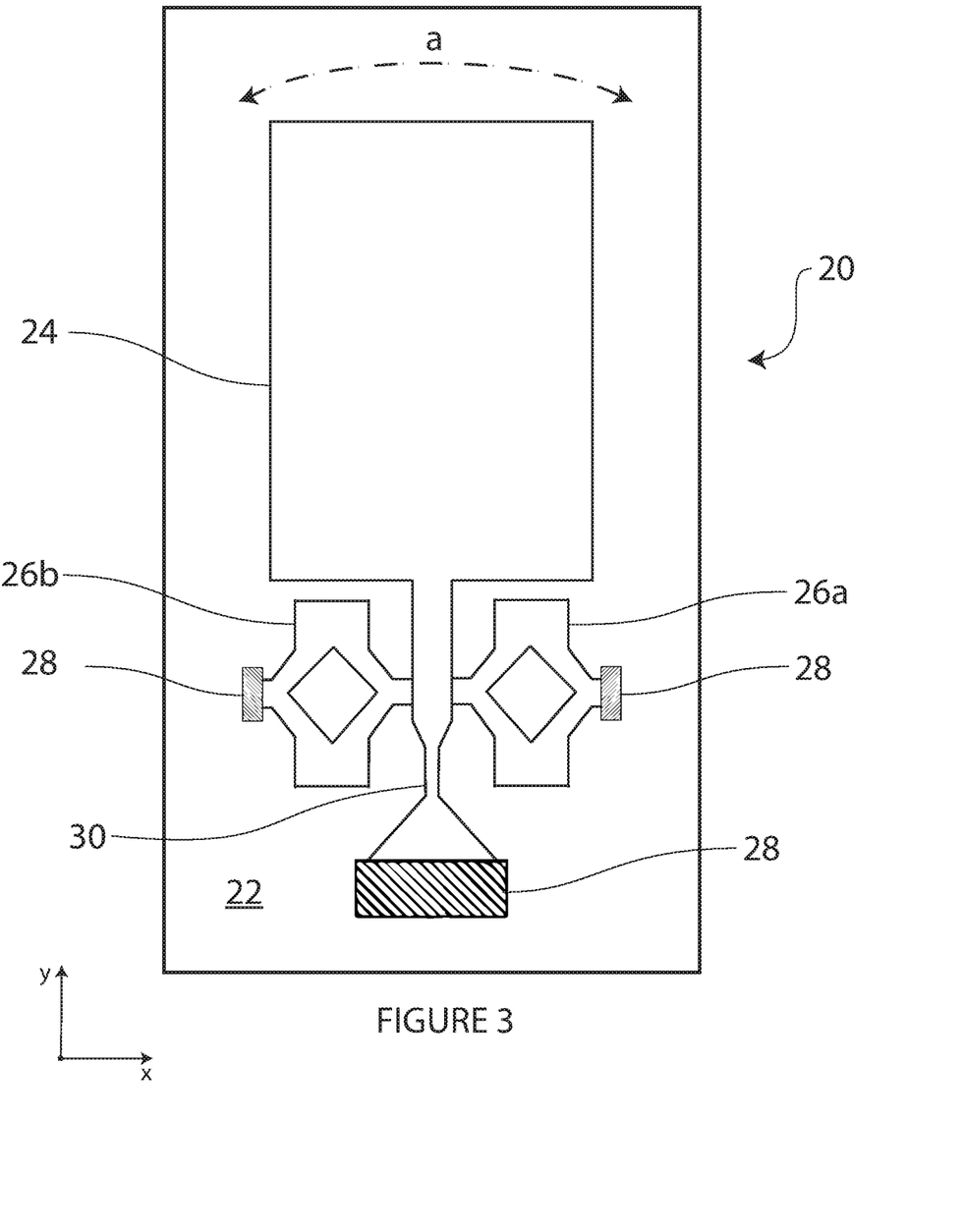
FIG. 3 illustrates a MEMS inertial sensor in accordance with the present disclosure, the MEMS inertial sensor having an in-plane proof mass capable of moving inpendulous motion.

Referring now to the drawings, a MEMS inertial sensor with a resonant pickoff in accordance with the present disclosure is generally indicated by reference numeral 20 in FIG. 3. Specifically, the MEMS inertial sensor 20 illustrated in FIG. 3 may be an accelerometer. The inertial sensor 20 may include a mounting structure 22, such as a substrate, a reference mass 24, and a pair of resonant mechanical structures 26a, 26b. Mounting structure 22 may be fabricated of several types of material, including but not limited, to silicon, glass, quartz, and crystalline GE. Sensor 30 may include only a single resonant mechanical structure, or may include two, three or more resonant mechanical structures.

Reference mass 24 may be connected to mounting structure 22 via an anchor point 28. In a further embodiment, reference mass 24 may be attached to a hinge 30 that is connected to the anchor point 28. The hinge 30 enables the reference mass 24 to move in a pendulous motion PM within a reference mass plane XY. Reference mass plane XV may lie in a coordinate system defined by coordinate X and coordinate Y. In the embodiment shown in FIG. 3, the reference mass plane XY is substantially parallel to the mounting structure 22. The resonant mechanical structures 26a, 26b may also connected to the mounting structure 22 via a plurality of anchor points 28. Additionally, each of the resonant mechanical structures 26a, 26b may be connected to the reference mass 24. The resonant mechanical structures 26a, 26b may be oriented relative to the reference mass 24 in a manner such that movement of the reference mass in a clockwise direction places resonant mechanical structure 26a in a state of compression and resonant mechanical structure 26b in a state of tension. Conversely, movement of the reference mass 24 in a counter-clockwise direction places resonant mechanical structure 26a in a state of tension and resonant mechanical structure 26b in a state of compression.

Figure 4A:
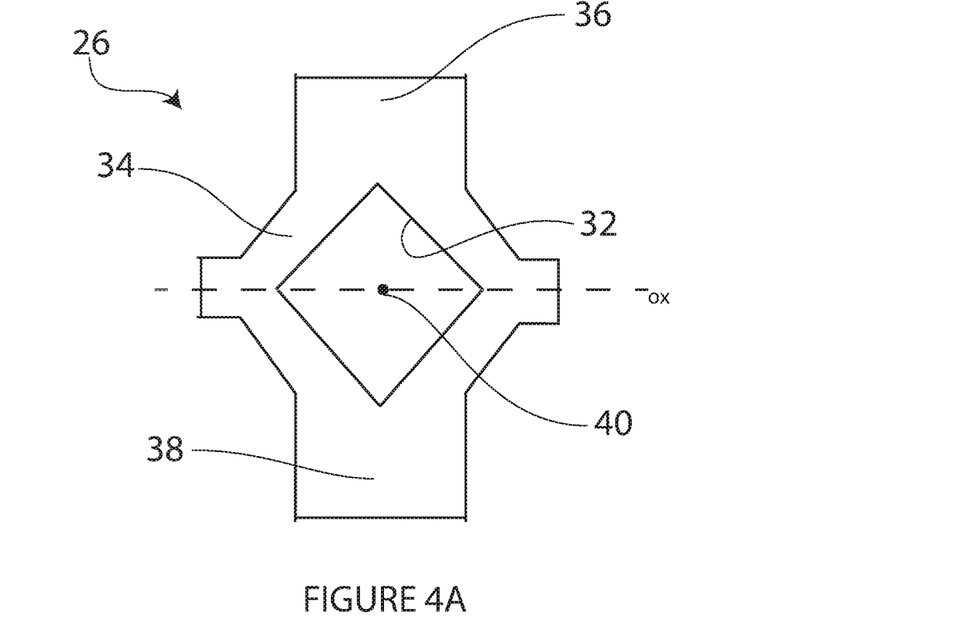
FIG. 4a illustrates a top view of a resonant mechanical structure in accordance with the present disclosure.
Figure 4B:
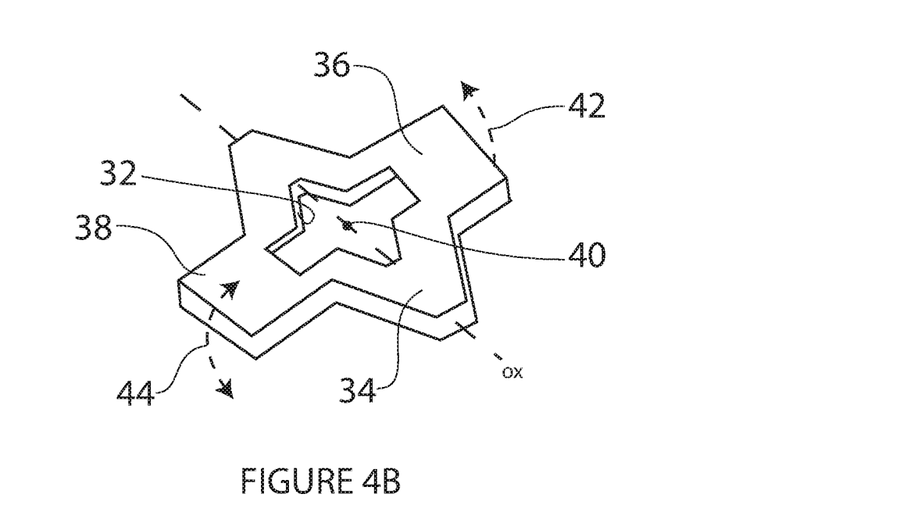

Referring now to FIGS. 4a and 4b, each of the resonant mechanical structures 26a, 26b may comprise a body 34 and an opening 32. In some embodiments, the body 34 may surround and define the openings 32. The body 34 may include a first mass portion 36, such as an upper mass, and second mass portion 38, such as a lower mass. The body 34 also has a center of mass 40. The resonant mechanical structure 26 is configured such that the first/upper mass 36 and the second/lower mass 38 oscillate about an oscillation axis OX. The oscillation axis OX may be located within the reference mass plane XY. The resonant mechanical structure 26 is designed such that the resonant mechanical structure can be excited into an oscillatory motion having a resonant frequency such that the first/upper mass 36 and the second/lower mass 38 oscillate about the oscillation axis OX and the body's center of mass 40 is located on the oscillation axis. When excited into the oscillatory motion, the first/upper mass 36 will follow an upper oscillation path 42 and the second/lower mass 38 will follow a lower oscillation path 44.

Figure 5:
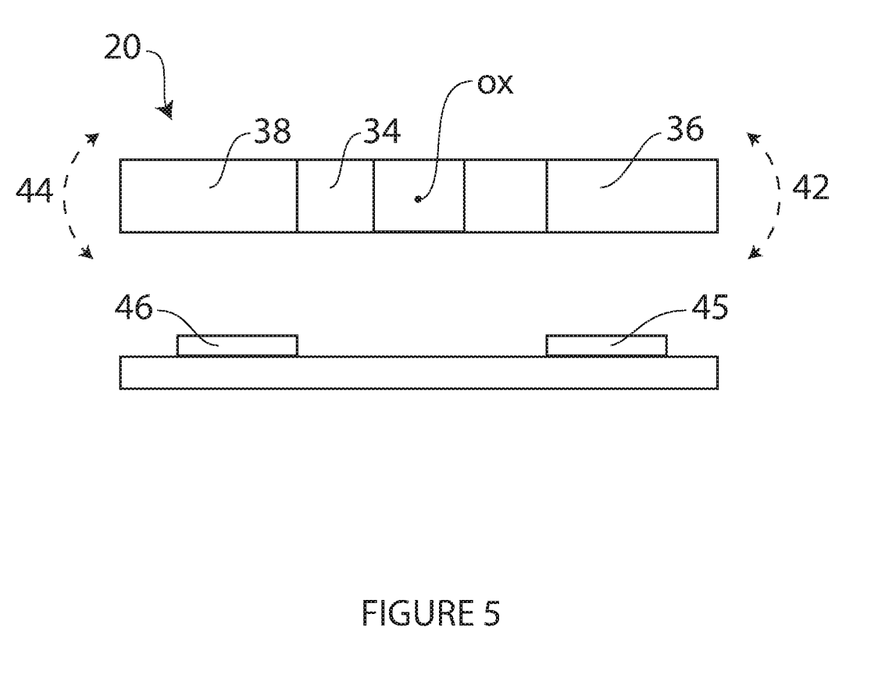
FIG. 5 illustrates a MEMS inertial sensor similar to the one shown in FIG. 3, the inertial sensor including a driving electrode and a sensing mechanism.

Resonant mechanical structure 26 may be driven into oscillatory motion in various ways. For example, as shown in FIG. 5, the MEMS inertial sensor 20 may include a driving electrode 45. Driving electrode 45 may be positioned relative to the first/upper mass 36 in a manner such that the driving electrode can pull and/or push the first/upper mass 36 with a certain constant force, thereby setting the resonant mechanical structure 26 into oscillatory motion. Sensor 20 may further include a sensing mechanism 46 for detecting resonant frequency. As shown in FIG. 5, sensing mechanism 46 may be, for example, a capacitive gap sensor positioned relative to the second/lower mass 38 in a manner such that the capacitive gap sensor may sense the resonant frequency of oscillation of the second/lower mass 38. Using this type of an arrangement, the MEMS inertial sensor 20 can detect the resonant frequency of the resonant mechanical structure 26. It should be noted that in an alternative embodiment driving electrode 45 may positioned on second/lower mass 38, and sensing mechanism 46 may sense the oscillation of the first/upper mass 36. In embodiments where sensor 20 may include multiple resonant mechanical structures, such additional structure may feature bodies which are similar or identical to that of resonant mechanical structure 26.

The concept of operation for the resonant mechanical structure 26 is that it functions like a torsional pendulum. To calculate the resonant frequency $f_n$ of a torsional pendulum, the following equation (Equation 1) is used:

$$f_n = \frac{1}{2\pi}\sqrt{\frac{k}{I}} \qquad (1)$$

In Equation 1, k is the torsional spring constant and I is the moment of inertia. Accordingly, Equation 1 implies an inverse proportionality of the resonant frequency $f_n$ to the square root of the moment of inertia I. Based on Equation 1, if the torsional spring constant k remains the same and the moment of inertia I increases, the resonant frequency $f_n$ will decrease. Conversely, if the torsional spring constant k remains the same and the moment of inertia I decreases, the resonant frequency $f_n$ will increase. The resonant mechanical structure 26 of the present disclosure uses the relationship between moment of inertia I and resonant frequency $f_n$ to enable sensor 20 to determine whether sensor 20 is exposed to acceleration along the sensing axis. As used throughout this disclosure, the term "sensing axis" refers to the axis (or axes) along which sensor 20 is designed to detect acceleration.

Figure 6:
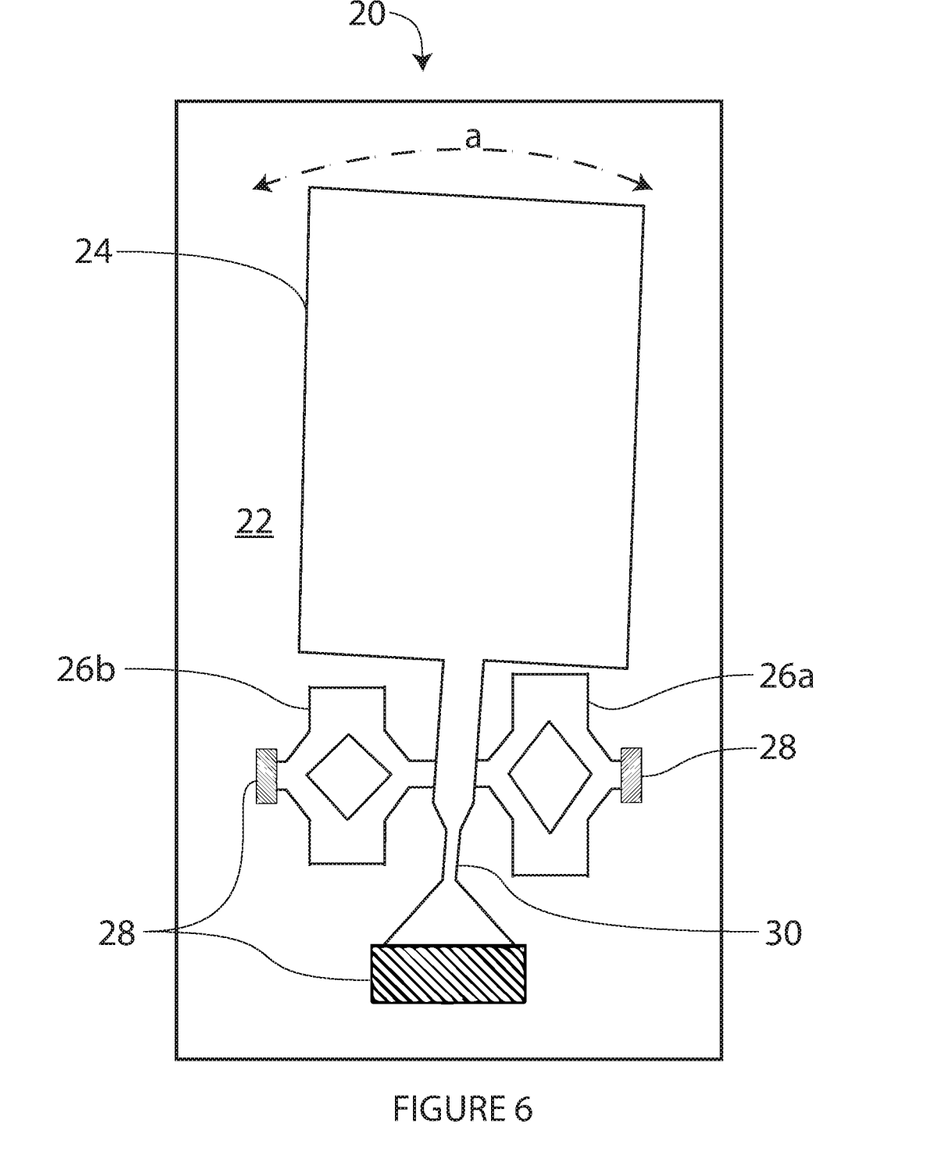
FIG. 6 illustrates the MEMS inertial sensor shown in FIG. 3, the proof mass being rotated in a clockwise position from the position shown in FIG. 3.
Figure 7:
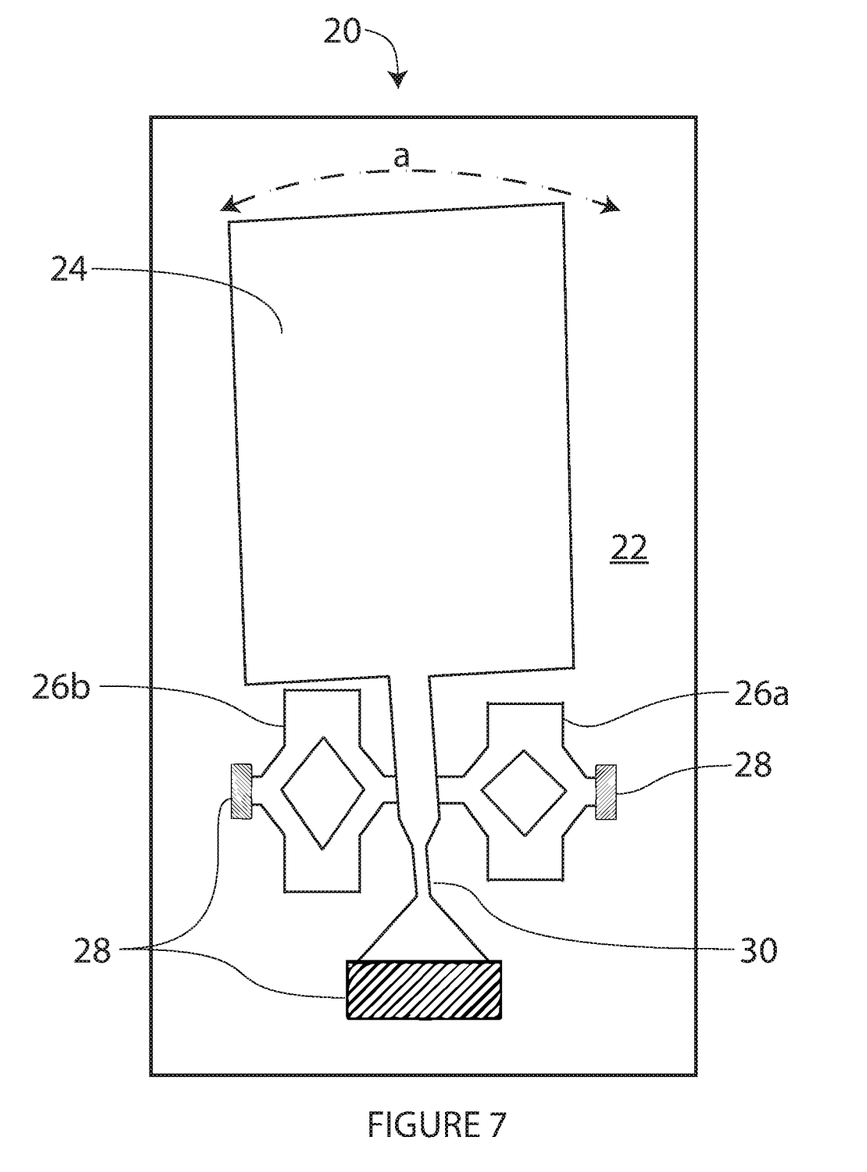
FIG. 7 illustrates the MEMS inertial sensor shown in FIG. 3, the proof mass being rotated in a counter-clockwise position from the position shown in FIG. 3.
Figure 8A:
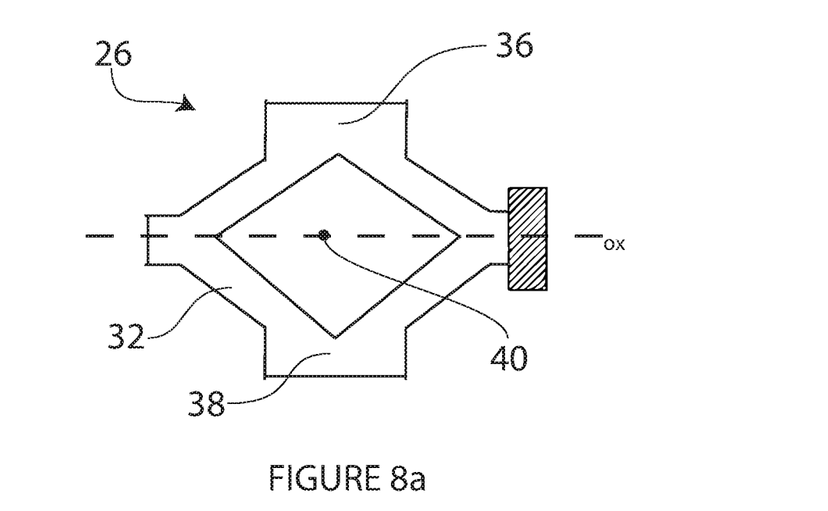
FIG. 8A shows the resonant mechanical structure illustrated in FIGS. 4a-4b in a state of tension.
Figure 8B:
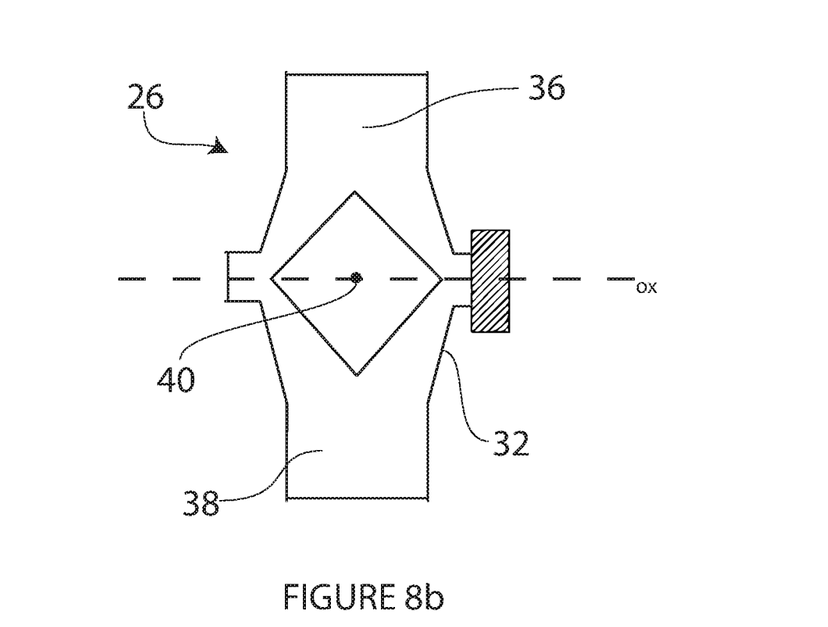
FIG. 8B shows the resonant mechanical structure illustrated in FIGS. 4a-4b in a state of compression.
Figure 9A:
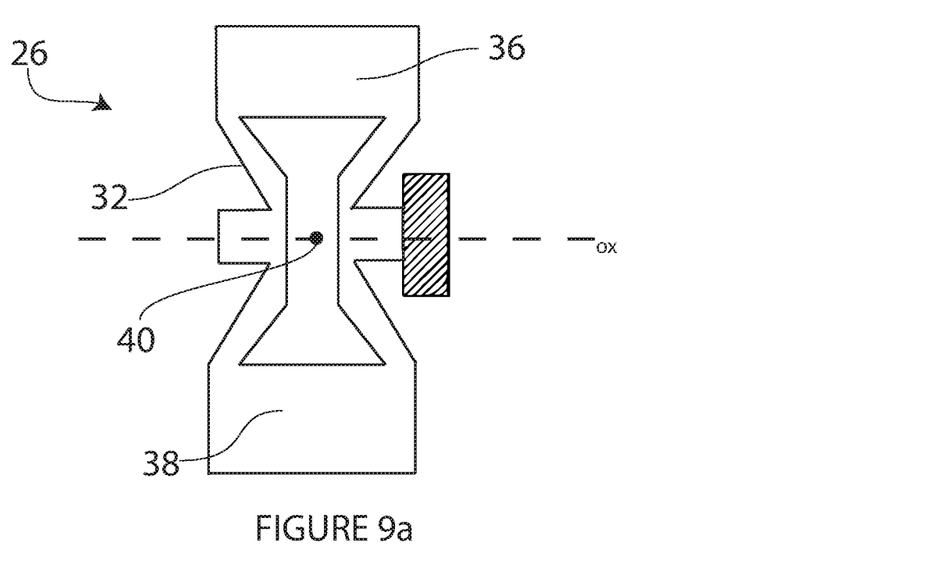
FIGS. 9a-9g illustrate a various alternative embodiments of a resonant mechanical structure in accordance with the present disclosure.
Figure 9B:
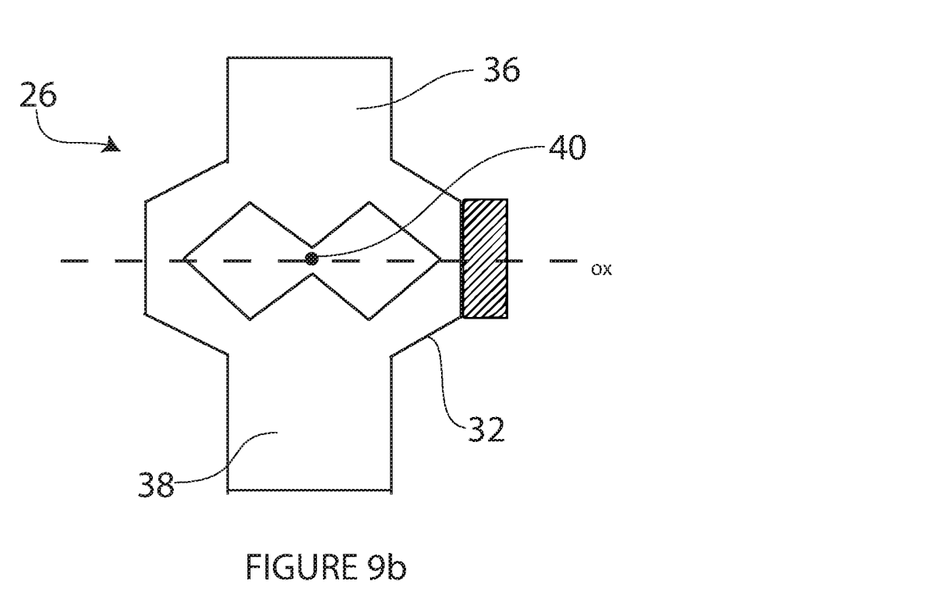
Figure 9C:
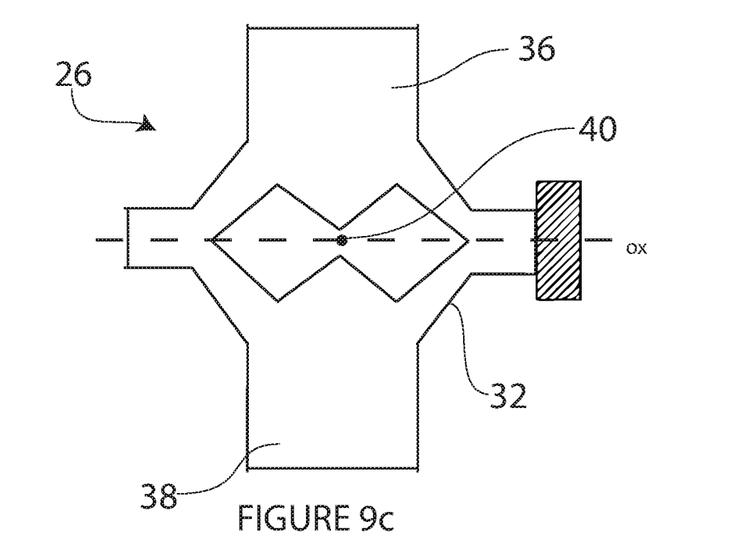
Figure 9D:
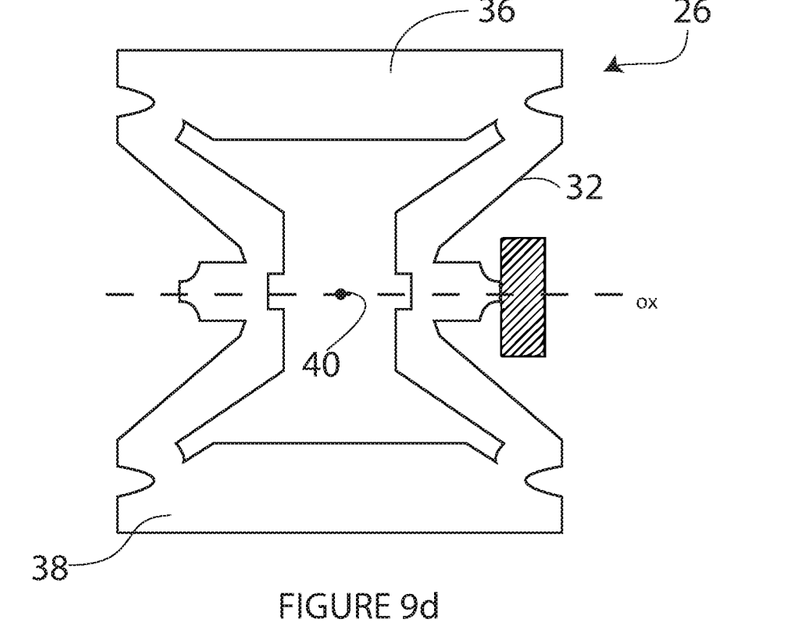
Figure 9E:
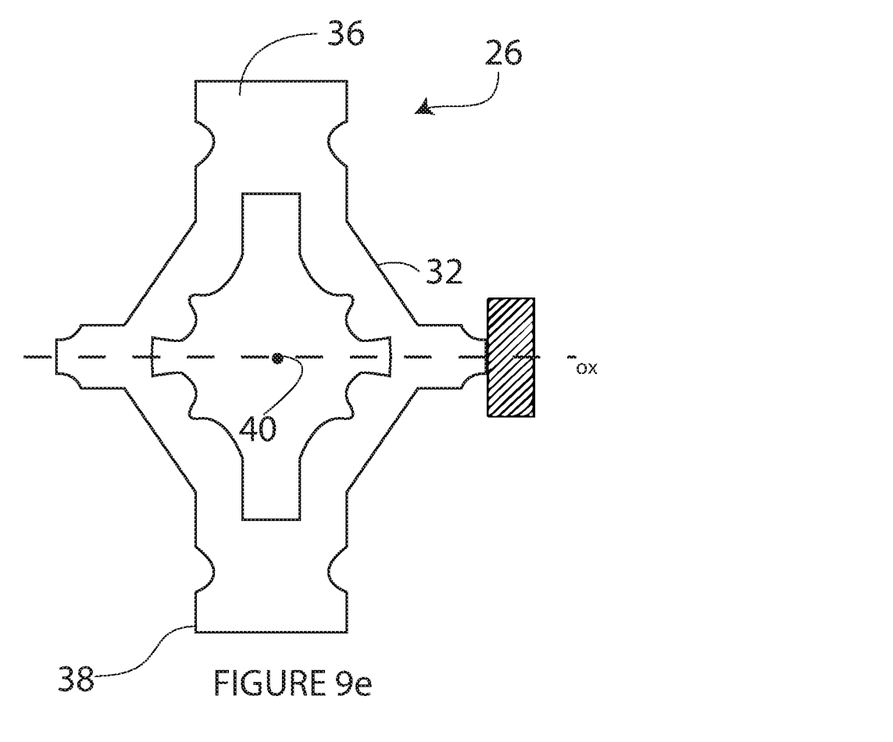
Figure 9F:
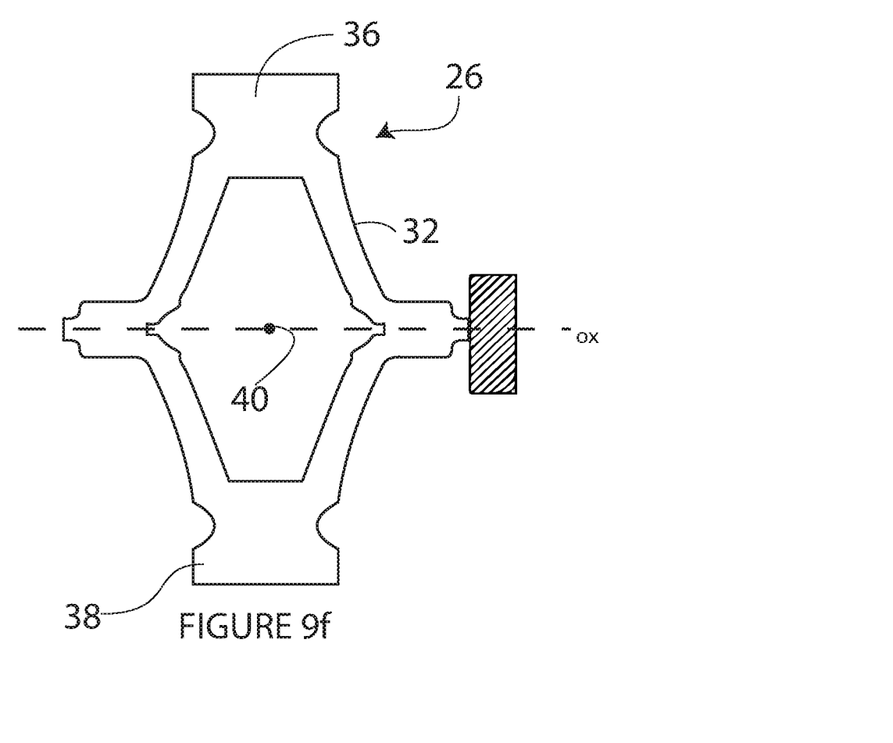
Figure 9G:
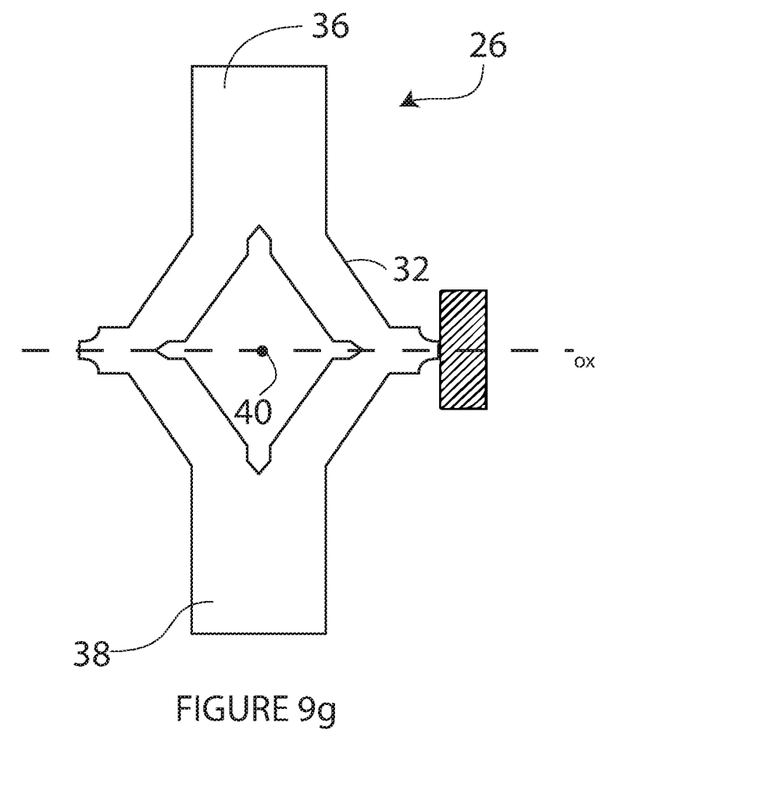

Specifically, resonant mechanical structure 26 is driven into oscillatory motion (e.g. via a driving electrode or other method known to a person of ordinary skill in the art) when reference mass 24 is in a first neutral position, for example, as shown in FIG. 3. When sensor 20 is exposed to acceleration along the sensing axis, the reference mass 24 moves to a second position, as shown in FIG. 6. When the reference mass 24 is in the second position, the body 32 of resonant mechanical structure 26b is in tension and the body 32 of resonant mechanical structure 26a is in compression. When the reference mass 24 is in the third position (as shown in FIG. 7), the body 32 of resonant mechanical structure 26b is in compression and the body 32 of resonant mechanical structure 26a is in tension. FIG. 8a shows resonant mechanical structure 26 in tension and FIG. 8b shows resonant mechanical structure 26 in compression.

The geometric shape of the body 32 of each resonant mechanical structure 26a, 26b changes depending on the position of the reference mass 24; however, the center of mass 40 for each body 32 remains located on the respective oscillation axis OX. Changing the geometric shape of each body 32 as its upper and lower masses 36, 38 are oscillating about the oscillation axis OX changes the moment of inertia for each body 32.

For example, in FIG. 3, wherein the reference mass 24 is in the first neutral position, body 32 of resonant mechanical structure 26a has a first moment of inertia and a first resonant frequency. When the reference mass 24 is in the second position, body 32 of resonant mechanical structure 26a has a second moment of inertia and a second resonant frequency. As shown in FIG. 6, the second moment of inertia would be greater than the first moment of inertia because upper and lower masses 36, 38 are spaced a greater radial distance from the oscillation axis OX than in FIG. 3. Because the second moment of inertia is greater than the first moment of inertia, the second resonant frequency will be less than the first resonant frequency. When the reference mass is in the third position, body 32 of resonant mechanical structure 26a has a third moment of inertia and a third resonant frequency. As shown in FIG. 7, the third moment of inertia would be less than the first moment of inertia because upper and lower masses 36, 38 are a spaced a lesser radial distance from the oscillation axis OX than in FIG. 3. Because the third moment of inertia is less than the first moment of inertia, the third resonant frequency will be greater than the first resonant frequency. The sensing mechanism 46 of sensor 20 may configured to detect the difference in the resonant frequency of each body 32 as the reference mass 24 moves from the first neutral position to either the second or third positions. Calculating the difference between, for example, the first resonant frequency and the second resonant frequency enables sensor 20 to determine acceleration along the sensing axis.

Using a resonant pick-off as described in this disclosure, the moment of inertia of body 32 within sensor 20 is linearized such that the varying moment of inertia, which is based on a linear displacement of the upper and lower masses 36, 38, is the primary variable responsible for varying the resonant frequency. This differs from the MEMS accelerometer discussed in the Background Section, which relies solely on the force exerted by a reference mass 18 on the oscillatory beam 16 to vary the resonant frequency. By relying on the moment of inertia which varies based on a linear displacement of the upper and lower masses 36, 38, the resonant mechanical structure 26 removes many of the non-linear effects present in beam deformation. Consequently, the resonant mechanical structure 26 reduces the scale factor error associated with sensor 20 relative to the MEMS accelerometers discussed in the Background Section.

FIGS. 9a through 9g show various alternative embodiments of a resonant mechanical structure in accordance with the present disclosure. A person of ordinary skill in the art will understand that there are other potential embodiments of the resonant mechanical structure with varying geometric shapes.

Figure 10:
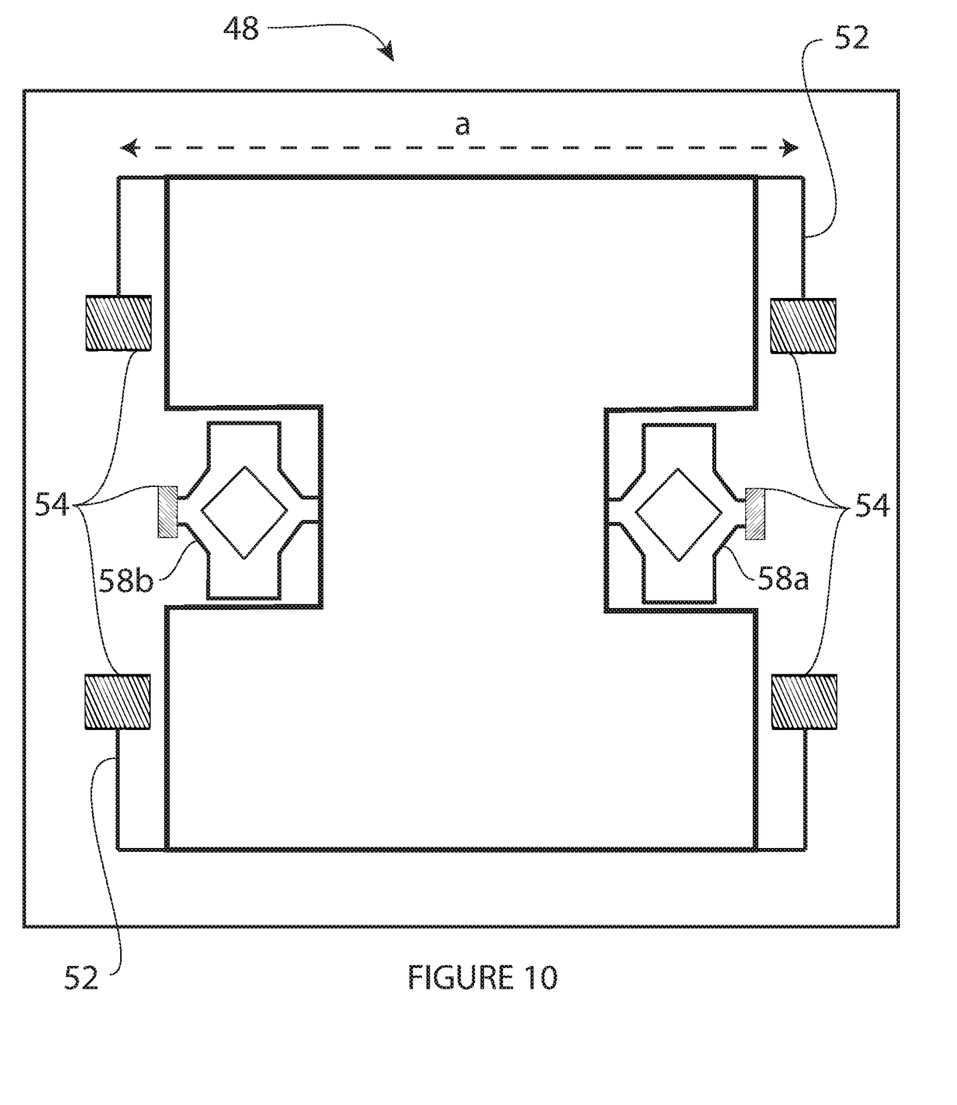
FIG. 10 illustrates an alternative embodiment a MEMS inertial sensor in accordance with the present disclosure, the MEMS inertial sensor having an in-plane proof mass capable of moving in a linear motion.

FIG. 10 shows an alternative embodiment of a sensor 48, such as a MEMS inertial sensor, with a resonant pick-off in accordance with the present disclosure. In FIG. 10, reference mass 50 is configured to move in a linear motion within the reference mass plane XY rather than a pendulous motion. Sensor 48 further includes a plurality of flexures 52 to connect the reference mass 50 to a plurality of anchor points 54. The anchor points 54 in turn connect the reference mass 50 to a mounting structure 56, such as a mounting substrate. The resonant mechanical structures 58a, 58b of sensor 48 are structured and operate in a similar manner as described above with reference to sensor 20.

Although the embodiment of sensor 20 in FIG. 3 and sensor 48 in FIG. 10 are in-plane inertial sensors (i.e. a sensor with an input axis that is substantially parallel to the mounting structure/substrate), a person of ordinary skill in the art will understand that the resonant mechanical structure could be incorporated into an out-of-plane inertial sensor (e.g. a sensor having an input axis perpendicular to the mounting structure/substrate). Furthermore, a person of ordinary skill in the art would recognize that the embodiments of the MEMS inertial sensors presented herein could be fabricated using any material or process suitable for a MEMS device. A person of ordinary skill in the art would also recognize that the concepts and designs presented herein could be extended to other fabrication scales (e.g. Nano Electro Mechanical Systems ("NEMS")). Given the present disclosure, a person of ordinary skill in the art could conceive a number of electronic or opto-electronic interfaces for the generation of a useful output signal or message.

The foregoing description has been presented for the purposes of illustration and description. It is not intended to be exhaustive or to limit the disclosure to the precise form disclosed. Many modifications and variations are possible in light of this disclosure. Indeed, while certain features of this invention have been shown, described and/or claimed, it is not intended to be limited to the details above, since it will be understood that various omissions, modifications, substitutions and changes in the apparatuses, forms, method, steps and system illustrated and in its operation can be made by those skilled in the art without departing in any way from the spirit of the present invention.

Further, the foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, many modifications and variations are possible in view of the above teachings. For example, multi-axis resonant accelerometers may be formed in connection with the teachings of the invention. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A sensor comprising:
 a mounting structure;
 a reference mass configured to move within a reference mass plane;
 at least one resonant mechanical structure connected to the mounting structure and the reference mass, the resonant mechanical structure comprising a body and an aperture, wherein the aperture is surrounded and defined by the body, and wherein the body comprises:
  a first mass portion and a second mass portion that are configured to rotationally oscillate about an oscillation axis; and
  a center of mass located on the oscillation axis; and
 wherein a movement of the reference mass within the reference mass plane varies a moment of inertia of the body while the center of mass of the body remains located on the oscillation axis.

2. The sensor of claim 1, wherein the oscillation axis is parallel to the reference mass plane.

3. The sensor of claim 1, wherein the movement of the reference mass causes the first and second mass portions to move toward or away from the oscillation axis.

4. The sensor of claim 1, wherein the aperture is positioned on the oscillation axis, or the center of mass is positioned on or in the aperture.

5. The sensor of claim 1, wherein the first and second mass portions are configured to move toward or away from the oscillation axis while rotationally oscillating.

6. The sensor of claim 1, further comprising a second resonant mechanical structure connected to the mounting structure and the reference mass, the second resonant mechanical structure comprising a second body and a second aperture, wherein the second aperture is surrounded and defined by the second body, and wherein the second body comprises:
  a third mass portion and a fourth mass portion that are configured to oscillate about a second oscillation axis; and
  a second center of mass located on the second oscillation axis; and
  wherein the movement of the reference mass within the reference mass plane varies a moment of inertia of the second body while the second center of mass remains located on the second oscillation axis.

7. The sensor of claim 6, wherein the movement of the reference mass causes the first and second mass portions to move toward the oscillation axis and the third and fourth mass portions to move away from the second oscillation axis, or the first and second mass portions to move away from the oscillation axis and the third and fourth mass portions to move toward the second oscillation axis.

8. The sensor of claim 6, wherein the second oscillation axis intersects the oscillation axis, or is collinear, parallel, or orthogonal to the oscillation axis.

9. A resonant mechanical structure comprising:
  a body and an aperture, wherein the aperture is surrounded and defined by the body, and wherein the body comprises:
    a first mass portion and a second mass portion that are configured to rotationally oscillate about an oscillation axis; and
    a center of mass located on the oscillation axis.

10. The resonant mechanical structure of claim 9, wherein the body is configured to be directly or indirectly connected to a reference mass, and wherein the first and second mass portions are configured to move toward or away from the oscillation axis upon a movement of a reference mass connected to the body.

11. The resonant mechanical structure of claim 9, wherein the first and second mass portions are configured to move toward or away from the oscillation axis while rotationally oscillating.

12. The resonant mechanical structure of claim 9, wherein the body is configured to directly or indirectly connect to a reference mass in a manner such that a movement of the reference mass within a reference mass plane would vary a moment of inertia of the body while the center of mass of the body would remain located on the oscillation axis, and wherein the oscillation axis would be located within the reference mass plane.

13. The resonant mechanical structure of claim 9, wherein the body is configured to directly or indirectly connect to a reference mass, and wherein the first and second mass portions are configured to move away from the oscillation axis upon a movement of the reference mass causing a compression of the body, or toward the oscillation axis upon a movement of the reference mass causing a tension of the body.

14. The resonant mechanical structure of claim 9, wherein the aperture is positioned on the oscillation axis.

15. The resonant mechanical structure of claim 14, wherein the center of mass is positioned on or in the aperture.

16. A method of measuring a force, comprising:
  using a resonant mechanical structure to measure a movement of a reference mass within a reference mass plane, wherein the resonant mechanical structure is connected to the reference mass, and wherein the resonant mechanical structure comprises:
    a body and an aperture, wherein the aperture is surrounded and defined by the body, and wherein the body comprises:
      a first mass portion and a second mass portion that are configured to rotationally oscillate about an oscillation axis; and
      a center of mass located on the oscillation axis.

17. The method of claim 16, wherein the aperture is positioned on the oscillation axis, or the center of mass is positioned on or in the aperture.

18. The method of claim 16, wherein the resonant mechanical structure is connected to the reference mass in a manner such that a movement of the reference mass within the reference mass plane varies a moment of inertia of the body while the center of mass of the body remains located on the oscillation axis.

19. The method of claim 16, wherein the first and second mass portions are configured to move toward or away from the oscillation axis upon a movement of the reference mass.

20. The method of claim 19, wherein the first and second mass portions are configured to move away from the oscillation axis upon a movement of the reference mass causing a compression of the body, or toward the oscillation axis upon a movement of the reference mass causing a tension of the body.

* * * * *